United States Patent
Colell et al.

(10) Patent No.: US 11,964,418 B2
(45) Date of Patent: Apr. 23, 2024

(54) ADJUSTING DEVICE AND METHOD FOR CONTROLLING AN EXIT THICKNESS OF A NOZZLE EXIT GAP OF A FLAT FILM MACHINE

(71) Applicant: Windmöller & Hölscher KG, Lengerich (DE)

(72) Inventors: Waldemar Colell, Lengerich (DE); Bernd-Alexander Groepper, Lengerich (DE); Torsten Schmitz, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 180 days.

(21) Appl. No.: 17/291,628

(22) PCT Filed: Nov. 5, 2019

(86) PCT No.: PCT/EP2019/080220
§ 371 (c)(1),
(2) Date: May 6, 2021

(87) PCT Pub. No.: WO2020/094631
PCT Pub. Date: May 14, 2020

(65) Prior Publication Data
US 2021/0402667 A1    Dec. 30, 2021

(30) Foreign Application Priority Data
Nov. 6, 2018    (DE) .................... 10 2018 127 670.2

(51) Int. Cl.
*B29C 48/31*    (2019.01)
*B29C 48/08*    (2019.01)
*B29C 48/92*    (2019.01)

(52) U.S. Cl.
CPC ............ *B29C 48/313* (2019.02); *B29C 48/08* (2019.02); *B29C 48/92* (2019.02); *B29C 2948/92152* (2019.02); *B29C 2948/92904* (2019.02)

(58) Field of Classification Search
None
See application file for complete search history.

(56) References Cited

U.S. PATENT DOCUMENTS

| 3,940,221 A | 2/1976 | Nissel |
| 4,445,837 A | 5/1984 | Cisar et al. |

(Continued)

FOREIGN PATENT DOCUMENTS

| AT | 161389 | 10/1990 |
| CH | 702058 | 4/2011 |

(Continued)

OTHER PUBLICATIONS

Office Action dated Feb. 16, 2022 From The Deutsches Patent- und Markenamt [German Patent and Trademark Office] Re. Application No. 10 2018 127 670.2 and its Translation into English.

(Continued)

*Primary Examiner* — Robert J Grun

(57) ABSTRACT

The invention relates to an adjusting device (10) for controlling a discharge thickness (AD) of a nozzle discharge slot (110) of a flat film machine (100), comprising a plurality of adjusting bolts (20) for carrying out an adjusting movement for changing the discharge thickness (AD), wherein the adjusting bolts (20) comprise an adjusting region (SB) between a closing end position (SE) and an opening end position (OE), wherein further starting from the opening end position (OE), the adjusting region (SB) comprises a basic stroke path (BH) for a basic adjustment of the discharge thickness (AD) and, starting from the closing end position (Continued)

US 11,964,418 B2

Page 2

(SE), comprises a process stroke path (PH) for process controlling of the discharge thickness (AD).

5 Claims, 4 Drawing Sheets

(56) References Cited

U.S. PATENT DOCUMENTS

| | | |
|---|---|---|
| 4,454,082 A | 6/1984 | Cisar et al. |
| 4,454,084 A | 6/1984 | Smith et al. |
| 4,592,710 A | 6/1986 | Reifenhaeuser et al. |
| 4,753,587 A | 6/1988 | Djordjevic et al. |
| 4,804,557 A | 2/1989 | Anthony, Jr. et al. |
| 5,208,047 A | 5/1993 | Cloeren et al. |
| 5,587,184 A | 12/1996 | Leonard et al. |
| 5,770,129 A | 6/1998 | Monti |
| 6,099,290 A | 8/2000 | Gross |
| 8,702,414 B1 | 4/2014 | Pitsch et al. |
| 9,302,420 B1 | 4/2016 | Darrow et al. |
| 10,272,609 B2 | 4/2019 | Pitsch |
| 10,456,969 B2 | 10/2019 | Pozgainer et al. |
| 2002/0175434 A1 | 11/2002 | Uehara et al. |
| 2003/0050717 A1 | 3/2003 | Hirata et al. |
| 2011/0006452 A1 | 1/2011 | Bayer et al. |
| 2012/0315378 A1 | 12/2012 | Yapel et al. |
| 2013/0127086 A1 | 5/2013 | Derks et al. |
| 2021/0402670 A1 | 12/2021 | Colell et al. |

FOREIGN PATENT DOCUMENTS

| | | |
|---|---|---|
| CN | 1197421 | 10/1998 |
| CN | 1392831 | 1/2003 |
| CN | 101365571 | 2/2009 |
| CN | 102712125 | 10/2012 |
| CN | 103747938 | 4/2014 |
| CN | 104552869 | 4/2015 |
| CN | 106584736 | 4/2017 |
| CN | 107175804 | 9/2017 |
| CN | 107175808 | 9/2017 |
| CN | 107322905 | 11/2017 |
| CN | 107379494 | 11/2017 |
| CN | 107866958 | 4/2018 |
| CN | 112118948 | 12/2020 |
| DE | 2229924 | 1/1973 |
| DE | 3531005 | 3/1986 |
| DE | 4020728 | 1/1991 |
| DE | 19535930 | 1/1997 |
| DE | 19855751 | 6/2000 |
| DE | 10117946 | 10/2002 |
| DE | 102016112121 | 1/2018 |
| EP | 0079052 | 5/1983 |
| EP | 1964659 | 9/2008 |
| EP | 2657000 | 10/2013 |
| EP | 2837484 | 2/2015 |
| EP | 2865511 | 4/2015 |
| FR | 2878183 | 5/2006 |
| GB | 2162119 | 1/1986 |
| JP | 01-232018 | 9/1989 |
| JP | 01-257023 | 10/1989 |
| JP | 06-071729 | 3/1994 |
| JP | 07-329147 | 12/1995 |
| JP | 08-085145 | 4/1996 |
| JP | 08-267536 | 10/1996 |
| JP | 08-276491 | 10/1996 |
| JP | 09-309138 | 12/1997 |
| JP | 2000-094497 | 4/2000 |
| JP | 2001-030340 | 2/2001 |
| JP | 2001-310372 | 11/2001 |
| JP | 2002-096371 | 4/2002 |
| JP | 2003-089146 | 3/2003 |
| JP | 2004-122434 | 4/2004 |
| JP | 2013-039677 | 2/2013 |
| JP | 2013-240897 | 12/2013 |
| JP | 2014-019079 | 2/2014 |
| JP | 2016-179460 | 10/2016 |
| LU | 65607 | 10/1972 |
| WO | WO 2012/170713 | 12/2012 |
| WO | WO 2020/094635 | 5/2020 |
| WO | WO 2021/170713 | 9/2021 |

OTHER PUBLICATIONS

Notification of Office Action and Search Report dated Mar. 28, 2022 From the State Intellectual Property Office of the People's Republic of China Re. Application No. 201980065872.7 together with English Summary . . . (9 Pages).

Internationaler Recherchenbericht und Schriftlicher Bescheid [International Search Report and the Written Opinion] dated Feb. 3, 2020 From the International Searching Authority Re. Application No. PCT/EP2019/080220 and Its Translation of Search Report Into English. (13 Pages).

Pruefungsantrag [Request for Examination] dated Jul. 4, 2019 From the Deutsches Patent- und Markenamt [German Patent and Trademark Office] Re. Application No. 102018127670.2 and Its Summary in English. (6 Pages).

International Preliminary Report on Patentability dated May 8, 2020 From the International Preliminary Examining Authority Re. Application No. PCT/EP2019/062437. (8 Pages).

International Preliminary Report on Patentability dated May 11, 2021 From the International Bureau of WIPO Re. Application No. PCT/EP2019/080227. (7 Pages).

International Preliminary Report on Patentability dated May 11, 2021 From the International Bureau of WIPO Re. Application No. PCT/EP2019/080254. (7 Pages).

International Preliminary Report on Patentability dated May 18, 2020 From the International Preliminary Examining Authority Re. Application No. PCT/EP2019/062429. (7 Pages).

International Preliminary Report on Patentability dated Sep. 18, 2020 From the International Preliminary Examining Authority Re. Application No. PCT/EP2019/062429. (21 Pages).

International Preliminary Report on Patentability dated Sep. 29, 2020 From the International Preliminary Examining Authority Re. Application No. PCT/EP2019/062437. (8 Pages).

Internationaler Recherchenbericht und Schriftlicher Bescheid [International Search Report and the Written Opinion] dated Aug. 19, 2019 From the International Searching Authority Re. Application No. PCT/EP2019/062429. (16 Pages).

Internationaler Recherchenbericht und Schriftlicher Bescheid [International Search Report and the Written Opinion] dated Feb. 19, 2020 From the International Searching Authority Re. Application No. PCT/EP2019/080254 and Its Translation Into English. (20 Pages).

Internationaler Recherchenbericht und Schriftlicher Bescheid [International Search Report and the Written Opinion] dated Aug. 21, 2019 From the International Searching Authority Re. Application No. PCT/EP2019/062437. (17 Pages).

Internationaler Recherchenbericht und Schriftlicher Bescheid [International Search Report and the Written Opinion] dated Jan. 30, 2020 From the International Searching Authority Re. Application No. PCT/EP2019/080227 and Its Translation of Search Report Into English. (13 Pages).

Interview Summary dated Sep. 8, 2023 from the US Patent and Trademark Office Re. U.S. Appl. No. 17/291,638. (3 pages).

Mitteilung Gemäß Artikel 94(3) EPÜ [Communication Pursuant to Article 94(3) EPC] dated Sep. 11, 2023 From the European Patent Office Re. Application No. 19798295.2 and Its Translation Into English. (10 Pages).

Mitteilung Gemäß Artikel 94(3) EPÜ [Communication Pursuant to Article 94(3) EPC] dated Nov. 18, 2021 From the European Patent Office Re. Application No. 19725089.7. (7 Pages).

Mitteilung Gemäß Artikel 94(3) EPÜ [Communication Pursuant to Article 94(3) EPC] dated Nov. 19, 2021 From the European Patent Office Re. Application No. 19725087.1 and Its Summary in English. (8 Pages).

(56) References Cited

OTHER PUBLICATIONS

Mitteilung Gemäß Artikel 94(3) EPÜ [Communication Pursuant to Article 94(3) EPC] dated Jun. 21, 2022 From the European Patent Office Re. Application No. 19725087.1 and Its Summary in English. (7 Pages).
Mitteilung Gemäß Artikel 94(3) EPÜ [Communication Pursuant to Article 94(3) EPC] dated Jun. 28, 2022 From the European Patent Office Re. Application No. 19725089.7 and Its Summary in English. (8 Pages).
Mitteilung nach Regel 114(2) EPÜ [Third Party Observation] Dated Aug. 2, 2021 From the European Patent Office Re. Application No. 19725087.1. (16 Pages).
Mitteilung nach Regel 114(2) EPÜ [Third Party Observation] Dated Aug. 2, 2021 From the European Patent Office Re. Application No. 19725089.7. (21 Pages).
Notification of Office Action and Search Report dated Dec. 2, 2021 From the State Intellectual Property Office of the People's Republic of China Re. Application No. 201980032808.9 and Its Summary in English. (9 Pages).
Notification of Office Action and Search Report dated Jul. 19, 2022 From the State Intellectual Property Office of the People's Republic of China Re. Application No. 201980071369.2 and Its Summary in English. (14 Pages).
Notification of Office Action and Search Report dated Jul. 21, 2022 From the State Intellectual Property Office of the People's Republic of China Re. Application No. 201980071150.2. (10 Pages).
Notification of Office Action and Search Report dated Apr. 27, 2022 From the State Intellectual Property Office of the People's Republic of China Re. Application No. 201980065872.7 and Its Summary in English. (7 Pages).
Notification of Office Action and Search Report dated Aug. 28, 2023 From the China National Intellectual Property Administration Re. Application No. 201980071150.2 and Its Translation of Office Action Into English. (39 Pages).
Notification of Office Action and Search Report dated Mar. 31, 2023 From the State Intellectual Property Office of the People's Republic of China Re. Application No. 201980071369.2 and Its Translation of Office Action Into English. (33 Pages).
Notification of Office Action dated Feb. 11, 2023 From the China National Intellectual Property Administration Re. Application No. 201980071150.2 and Its Translation of Office Action Into English. (23 Pages).
Notification of Office Action dated Jan. 12, 2023 From the China National Intellectual Property Office Re. Application No. 201980032808.9 and Its Translation of Office Action Into English. (12 Pages).
Notification of Office Action dated Jun. 17, 2022 From the China National Intellectual Property Administration Re. Application No. 201980032808.9 and Its Translation of Office Action Into English and Its Summary in English. (6 Pages).
Notification to Grant A Patent dated Jan. 20, 2023 From the State Intellectual Property Office of the People's Republic of China Re. Application No. 201980045567.1. (2 Pages).
Official Action dated Jun. 23, 2023 from the US Patent and Trademark Office Re. U.S. Appl. No. 17/291,638. (18 pages).
Pruefungsantrag [Request for Examination] dated Jul. 3, 2019 From the Deutsches Patent- und Markenamt [German Patent and Trademark Office] Re. Application No. 102018127671.0 and Its Summary in English. (6 Pages).
Pruefungsantrag [Request for Examination] dated Jul. 3, 2019 From the Deutsches Patent- und Markenamt [German Patent and Trademark Office] Re. Application No. 102018127673.7 and Its Summary in English. (6 Pages).
Prüfungsbescheid [Notice of Examination] dated Apr. 9, 2022 From the Deutsches Patent- und Markenamt [German Patent and Trademark Office] Re. Application No. 102018127671.0 and Its Summary in English. (7 Pages).
Prüfungsbescheid [Notice of Examination] dated Nov. 26, 2022 From the Deutsches Patent- und Markenamt [German Patent and Trademark Office] Re. Application No. 102018127673.7 and Its Summary in English. (6 Pages).
Restriction Official Action dated Mar. 23, 2023 from the US Patent and Trademark Office Re. U.S. Appl. No. 17/291,638. (6 pages).
Bezigian "A Survey of Current Bead Reduction Die Technology", PLC Technologies Consulting, p. 1-13, May 14, 1997.
Black Clawson Converting Machinery Corporation "Operation Manual for the Black Clawson R.O.I. Die", Black Clawson Converting Machinery Corporation, p. 1-36, Jan. 16, 1998.
Dai et al. "Optical Interferometry for Thickness Measurement of Opaque Thin Films and the Influence of Step Fabrication", Vacuum, 44(5): 8-12, Sep. 2007.
Egan Davis-Standard "Instructions for Operating The Egan Davis-Standard Millenium Converting Line—Egan Davis-Standard Series 50A Die With Internal Deckles", Egan Davis-Standard Instruction Manual, XP055861737, p. 1-35, Feb. 1999.
Götz et al. "Simulation and Optimization of Film Casting Processes", Progress in Industrial Mathematics at EMCI 2008, 15: 603-609, Published Online Jan. 1, 2010.
Keller "Affidavit by Mr. Ricky Keller", p. 1-3, Including Exhibits A, B and C, p. 4- 43, Jul. 15, 2021.
Vlachopoulos et al. "Flat Film and Sheet Dies", Design of Extrusion Forming Tools, Chap.4: 113-140, Dec. 2012.
Mitteilung Gemäß Artikel 94(3) EPU [Communication Pursuant to Article 94(3) EPC] dated Jul. 25, 2023 From the European Patent Office Re. Application No. 19798293.7 and Its Translation Into English. (10 Pages).

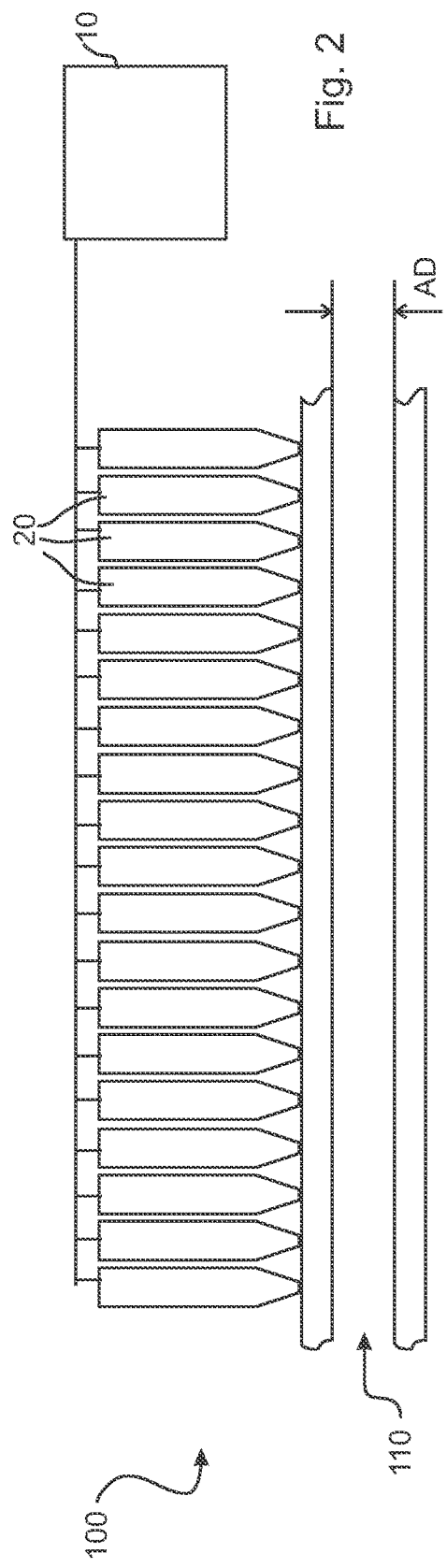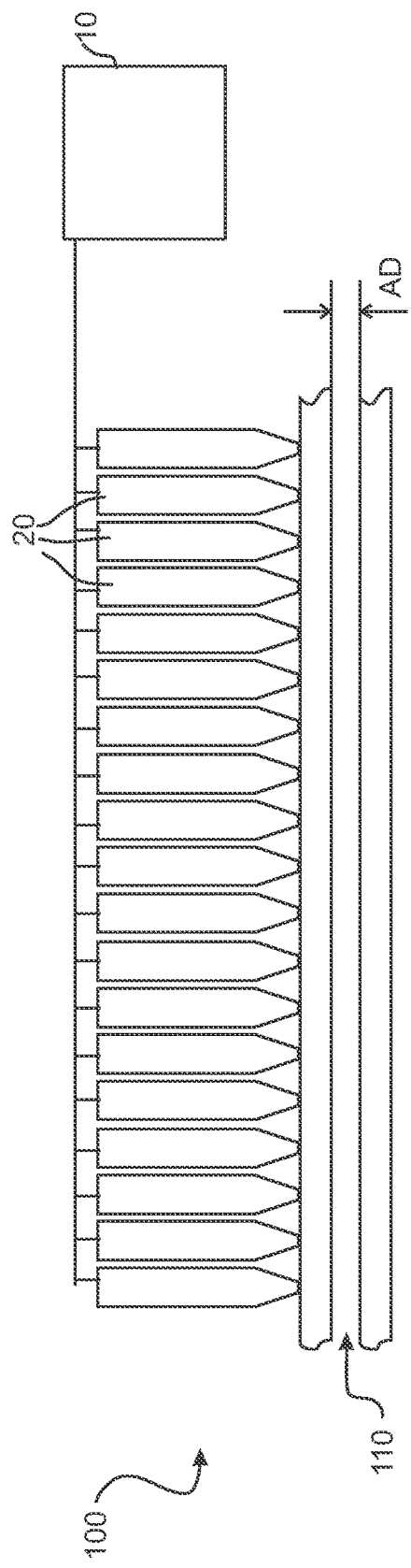

400
ADJUSTING DEVICE AND METHOD FOR CONTROLLING AN EXIT THICKNESS OF A NOZZLE EXIT GAP OF A FLAT FILM MACHINE

RELATED APPLICATIONS

This application is a National Phase of PCT Patent Application No. PCT/EP2019/080220 having International filing date of Nov. 5, 2019, which claims the benefit of priority of German Patent Application No. 10 2018 127 670.2 filed on Nov. 6, 2018. The contents of the above applications are all incorporated by reference as if fully set forth herein in their entirety.

FIELD AND BACKGROUND OF THE INVENTION

The present invention relates to an adjusting device for controlling a discharge thickness of a nozzle discharge slot of a flat film machine, and to a method for controlling such a nozzle discharge slot.

It is known that flat film machines are used to provide and produce flat film products. For this purpose, these flat film machines are provided with nozzle discharge slots or a nozzle discharge slot through which a melt can be discharged in a wide, flat form as a film track. Downstream of the nozzle discharge slot, the film track is applied to and cooled by a cooling roller. Further rollers in the flat film machine can be used to wind up the flat film produced in this way. In addition, it is also possible to coat or laminate the melt. For example, one or more flat tracks can be fed to the melt for this purpose.

A disadvantage of the known solutions for flat film machines is that at least some manual adjustment steps have to be carried out when changing between a feed product and a follow-on product. The same also applies during startup of the flat film machine in the first application or after stop phases or cleaning phases. In the known solutions, the manual adjustment is carried out in that the nozzle discharge slot is manually adjusted to a starting value. For this purpose, the known solutions provide screw elements on the upper side of adjusting bolts, which are adjusted individually and, above all, sequentially one after the other to the desired starting position by the operating personnel of the flat film machine. In the first step, the machine can still be at rest, i.e. outside the production status. It can already be seen here that the sequential adjustment of a large number of adjusting bolts takes a very long time. During this adjustment process, production cannot take place, so the flat film machine must be out of production. There is therefore a dead time for the flat film machine during which no production takes place. Another disadvantage of manual adjustment is that it is not reproducible or only with difficulty. Rather, the quality of this initial adjustment or re-adjustment of the individual adjusting bolts depends on the experience of the operating personnel and their sensitivity. In addition, with known solutions, an adjustment is also carried out with the machine running before the regulation is started.

SUMMARY OF THE INVENTION

It is an object of the present invention to at least partially eliminate the disadvantages described above. In particular, it is an object of the present invention to achieve reproducibility in the adjustment in a cost-effective and simple manner and, at the same time, to save time in this adjustment.

The foregoing object is solved by an adjusting device with the features of claim 1 and a method with the features of claim 6. Further features and details of the invention result from the dependent claims, the description and the figures. Features and details described in connection with the adjusting device according to the invention naturally also apply in connection with the method according to the invention and vice versa in each case, so that reference is or can always be made mutually with regard to the disclosure of the individual aspects of the invention.

According to the invention, an adjusting device is equipped for controlling a discharge thickness of a nozzle discharge slot of a flat film machine. For this purpose, the adjusting device comprises a plurality of adjusting bolts for carrying out an adjusting movement for changing the discharge thickness. The adjusting bolts comprise an adjusting region between a closing end position and an opening end position. Further, starting from the opening end position, this adjusting region is formed with a basic stroke path for a basic adjustment of the discharge thickness. Furthermore, starting from the closing end position, the adjusting region comprises a process stroke path for process controlling of the discharge thickness. Of course, within the scope of the present invention, the basic stroke path can also or additionally refer to the closing end position.

According to the invention, the adjusting device is now designed with the adjusting bolts in such a way that two different movements can be carried out by the same adjusting bolt with the same adjusting device. This will be explained in more detail in particular later with reference to the method. The first movement is the adjusting movement, so to speak, which replaces the previous manual adjustment to a starting value for each adjustment bolt. The second movement is the controlling movement or process movement, which is able to adjust or ensure the stability of the production and/or the quality of the product produced during operation.

According to the invention, the two steps of adjustment and process controlling are now possible in the adjusting device with one and the same adjusting device with one and the same adjusting bolt at the respective local position. In particular, all adjusting bolts can be adjusted by the adjusting device in this way and can also be activated with regard to process controlling, so that the advantages can be achieved for the entire nozzle discharge slot.

If, for example, a corresponding adjustment now takes place during the changing between two products during production with the flat film machine or also during startup or restart after the flat film machine has stopped, the procedure is as follows. In a first step, the adjusting device is used to move the plurality of adjusting bolts along the basic stroke path in the adjusting region. The movement of each adjusting bolt in the basic stroke path is carried out until the desired basic adjustment for the discharge thickness is adjusted. This is done in particular in an automated or partially automated manner. For example, corresponding drives can be provided on the adjusting bolts. If the adjusting bolts are so-called thermal bolts, which can be changed in terms of their elongation by the application of a temperature, both the adjustment and the process controlling can be carried out by thermal application, i.e. heating or cooling. The combination with mechanical adjusting means, for example so-called screw robots, is also conceivable on the respective adjusting bolt in the sense of the present invention.

Regardless of the actual technical means used for adjustment along the basic stroke path, however, process controlling can also be carried out automatically or partially automatically on the same adjusting bolt subsequently along the process stroke path.

As can be clearly seen from the above explanation, decisive advantages are enabled by the design according to the invention. On the one hand, this involves an at least partially temporally parallel adjustment along the basic stroke path at two or more adjusting bolts. In particular, a large number or even all of the adjusting bolts can be adjusted in parallel or at least partially overlapping in time along the basic stroke path. Whereas previously the large number of adjusting bolts had to be changed and adjusted sequentially one after the other in a manual manner by the operating personnel, a large time saving can be achieved by the at least partially temporally parallel adjustment. Symmetrical formation of the melt flow can also be achieved in this way, especially in edge sections of the film track. Since this adjustment along the basic stroke path can also be automated or at least partially automated, production of the flat film machine can already be running during this adjustment and melt can even already be produced. I.e., during the adjustment, the adjustment bolts and also the nozzle discharge slot are already in the heating mode or even already in the fully heated mode, so that a direct adjustment for operation becomes possible. The accuracy of the adjustment is significantly increased in this way. Last but not least, the possibility to automate or partially automate the adjustment along the basic stroke path also provides reproducibility of this adjustment. Whereas with known solutions the quality of this initial adjustment depended very much on the experience of the operating personnel, reproducibility is now possible through automated or partially automated operation. The adjustment along the basic stroke path can be provided both as a control and as a regulation with a corresponding measurement feedback.

As soon as the adjustment along the basic stroke path has been completed, the process controlling can be carried out. The process controlling is carried out with the adjusting bolts along the process stroke path adjacent to the basic stroke path. The respective adjusting bolt can be moved freely in the process stroke path. For special cases, for example in the case of large deviations or strong necessary regulation interventions, it may also be possible if the adjusting bolt is also changed in the basic stroke path for process controlling in addition to the process stroke path. In other words, the respective adjusting bolt can provide an increased process stroke path by moving along the basic stroke path.

It can be advantageous if, in an adjusting device according to the invention, the basic stroke path and the process stroke path are adjacent to each other or partially overlap. In this case, the basic stroke path necessarily starts from the opening end position in the adjusting region. In particular, for a method as will be explained later, the adjusting bolt is actually moved back to the opening end position in order to already have a defined starting position for the adjustment itself. The process stroke path in turn starts from the opposite end position, namely the closing end position. In particular, this is the position of the adjusting bolt in which it closes the nozzle slot completely locally at this position. In the intermediate region between the closing end position and the opening end position, it is possible for the basic stroke path and the process stroke path to still be spaced apart from one another. Preferably, however, the basic stroke path and the process stroke path are exactly adjacent to each other or at least partially overlap. This results in particularly simple adjustability, since the process controlling can be used directly at the end of the basic stroke path along the process stroke path.

Further advantages can be achieved if, in an adjusting device according to the invention, the sum of the process stroke path and the basic stroke path, in particular the entire adjusting region of the plurality of adjusting bolts, lies in the range between approx. 0.9 mm and approx. 2 mm, in particular in the range between approx. 1 mm and approx. 1.5 mm. These are particularly advantageous dimensional ranges in which a sufficiently large region of motion for the basic stroke path and the process stroke path and, at the same time, a compact geometry of the adjusting bolts can be achieved. In particular, therefore, the total stroke path consisting of process stroke path and basic stroke path, which represents the adjusting region of the respective adjusting bolt, is ≤2 mm. Preferably, all adjusting bolts are identical or essentially identical in design, so that the process stroke path and the basic stroke path or the entire extent of the adjusting region is also identical or essentially identical for all adjusting bolts.

A further advantage is achieved if, in an adjusting device according to the invention, a storage device is provided for storing the adjusting movement along the basic stroke path specific to each adjusting bolt. Such a storage device allows, for example, as will be explained later, to store the end of the respective adjusting movement of the basic stroke path specifically for each adjusting bolt. Thus, it should be pointed out that during the adjustment not only a common adjustment of all adjusting bolts to a same or identical starting value is possible, but also the adjustment to a desired specific and locally different discharge profile of the nozzle discharge slot. In the storage device, it is now possible to store the specific starting point for the subsequent process controlling exactly in the storage device as the end of the basic stroke path or as the end of this specific adjusting movement. Thus, at the start of the process controlling along the process stroke path, so to speak, exactly the respective starting position for each adjusting bolt is known. Whereas with known solutions the process controlling would have to be carried out blindly, so to speak, by manual adjustment, according to the invention the process controlling refers to defined and explicitly determined as well as stored output values as input variables.

A further advantage can be achieved if, in an adjusting device according to the invention, the plurality of adjusting bolts is arranged at least in sections on different sides of the nozzle discharge slot. On different sides of the nozzle discharge slot can thus mean in particular below and above this nozzle discharge slot. Thus, an influence on both sides from below and from above is possible. Preferably, all such adjusting bolts are parts of the adjusting device in accordance with the invention, so that the adjustment along the basic stroke path and the process controlling along the process stroke path can also be carried out from both sides of the nozzle discharge slot.

Also an object of the present invention is a method for controlling a nozzle discharge slot of a flat film machine with an adjusting device according to the invention, comprising the following steps:

adjusting a starting control value for the discharge thickness on a plurality of adjusting bolts by movement along the basic stroke path, controlling the discharge thickness based on a preset value by moving the plurality of adjusting bolts along the process stroke path.

By using an adjusting device according to the invention, a method according to the invention has the same advantages as have been explained in detail with reference to an adjusting device according to the invention. In this context, the first movement along the basic stroke path can also be referred to as the adjusting movement. The movement of each adjusting bolt along the process stroke path may also be referred to as the controlling movement or process movement of each adjusting bolt.

A method according to the invention can be further improved in that, after the adjusting movement of the discharge thickness along the basic stroke path, the end position of this adjusting position is stored as the starting position for the subsequent controlling movements of the adjusting bolts. Of course, the respective end positions of controlling movements of the adjusting positions can also be stored in order to know the defined starting position for each necessary adjusting movement of each adjusting bolt over a longer production process. According to the invention, such storage of the respective starting position can be made in a corresponding storage device, as already explained with reference to the adjusting device according to the invention. In this case, the storage takes place specifically for the individual adjusting bolts, so that the method can refer to the respective adjusting position or the relative position reached in each case.

It is also advantageous if, in a method according to the invention, the adjusting movement and the controlling movement are at least partially performed in parallel in time. Preferably, several adjusting movements and/or several controlling movements of several adjusting bolts can also be performed at least partially in parallel in time. In this embodiment, the adjustment passes over to the controlling, so to speak, so that a changing or a start-up of the flat film machine with a transition to the production operation is possible even faster. A complete overlapping of the adjusting movement and the controlling movement in terms of time is also conceivable in the sense of the present invention.

Further advantages can be achieved if, in a method according to the invention, the adjusting movement takes place without clearance or at least with little clearance. This means that during the adjustment, the corresponding adjusting bolt is first placed on an upper side of the nozzle lip of the nozzle discharge slot. This can be done, for example, with a defined setting force. Reducing the clearance between this nozzle lip and the individual adjusting bolts allows even more precise controlling, since empty runs can be avoided. In fact, the exact position of the adjusting bolt and, in particular due to the absence of clearance, the corresponding relative correlation of the associated nozzle lip is also known precisely or essentially precisely.

A further advantage can be achieved if, in a method according to the invention, the adjusting movement and/or the controlling movement takes place at least in sections locally with a selection of adjacent adjustment bolts. Local controlling of individual adjusting bolts is particularly advantageous for the controlling movement. Thus, a local controlling can lead to a displacement of the corresponding discharge profile. However, global adjustments or adjustments over a very large local region are also conceivable in the sense of the present invention. In particular, the adjusting movement tends to be performed globally and the controlling movement tends to be performed in a local manner.

BRIEF DESCRIPTION OF THE SEVERAL VIEWS OF THE DRAWINGS

Further advantages, features and details of the invention will be apparent from the following description, in which embodiments of the invention are described in detail with reference to the figures. In this connection, the features mentioned in the claims and in the description may each be essential to the invention individually or in any combination. The figures schematically show:

DESCRIPTION OF SPECIFIC EMBODIMENTS OF THE INVENTION

Figure 1:
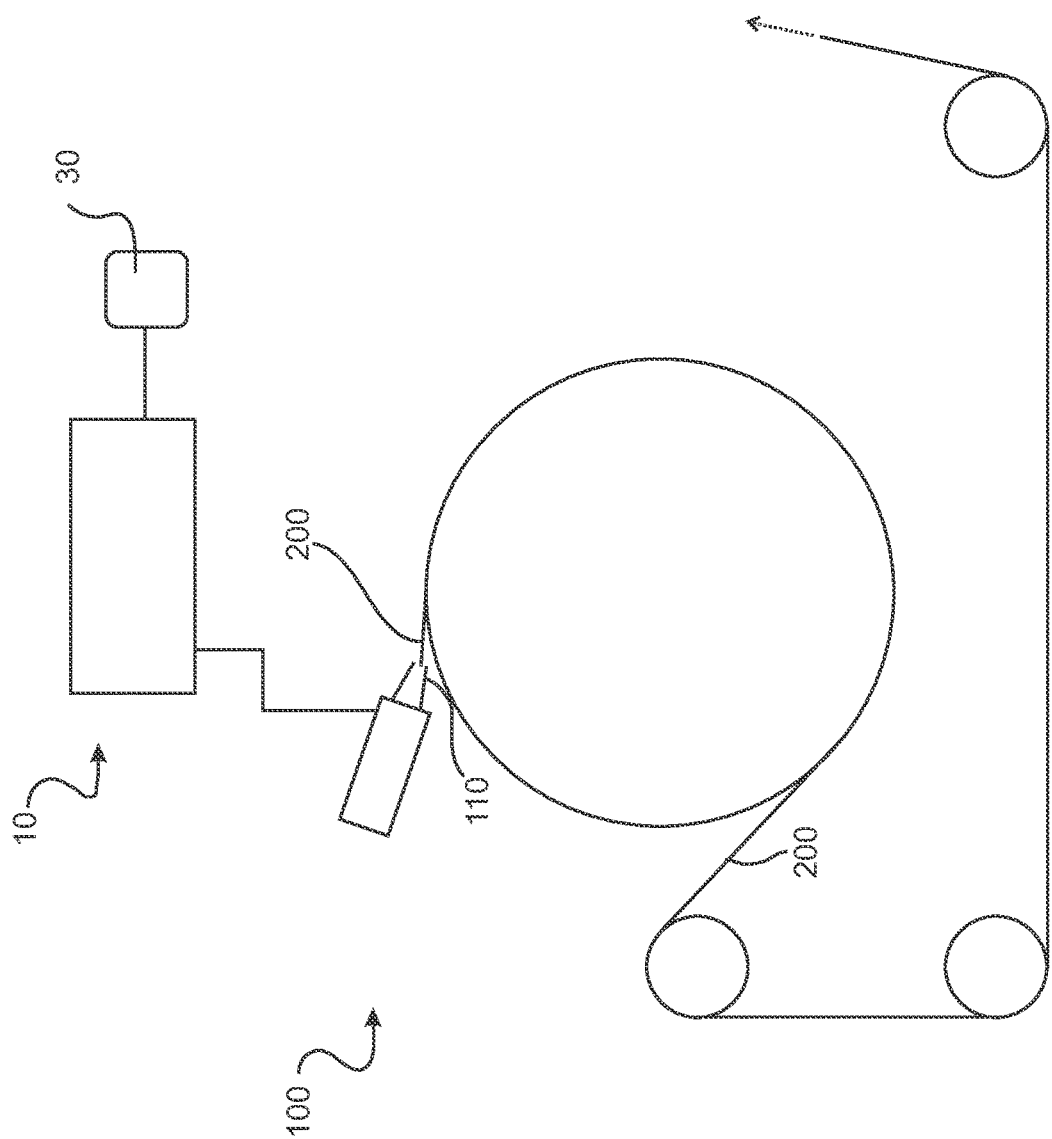
FIG. 1 an embodiment of a flat film machine with an adjusting device according to the invention, FIG. 2 the embodiment of FIG. 1 in a detailed view of the nozzle discharge slot, FIG. 3 the embodiment of FIG. 2 with a smaller nozzle discharge slot, FIG. 4 the embodiment of FIGS. 1 to 3 before the clearance free adjustment of adjusting bolts, FIG. 5 the embodiment shown in FIG. 4 with adjusting bolts set free of clearance, FIG. 6 a representation of an adjusting bolt with an adjusting region, FIG. 7 the representation of the movement of the adjusting bolt along the basic stroke path and FIG. 8 the representation of an adjusting bolt in motion during the process controlling.

FIG. 1 schematically shows a flat film machine 100. The melt is discharged via a nozzle discharge slot 110, which cools as a film track 200 on a large casting roller or cooling roller. Further conveying of the cooled film track 200 is shown here with an arrow and can lead, for example, to a winding reel. With the aid of an adjusting device 10, it is possible to vary the discharge thickness AD of the nozzle device 110, so that influence can be exerted on the thickness profile of the melt or the thickness profile of the film track 200. It can also be clearly seen here how the adjusting device 10 can refer to a corresponding storage device 30, in which the storage of specific relative positions of the individual adjusting bolts 20 can occur.

FIGS. 2 and 3 show a top view of the nozzle discharge slot 110 of the flat film machine 100. With the aid of the adjusting device 10, all individual adjusting bolts 20 can now be specifically controlled with regard to their length extension. For example, in order to set a first reduced discharge thickness AD, starting from FIG. 2, the temperature can be increased for thermal bolts as adjusting bolts 20 until the increased extension of the individual adjusting bolts 20 at increased temperature has reduced the nozzle discharge slot 110 to the reduced discharge thickness AD according to FIG. 3.

Figure 4:
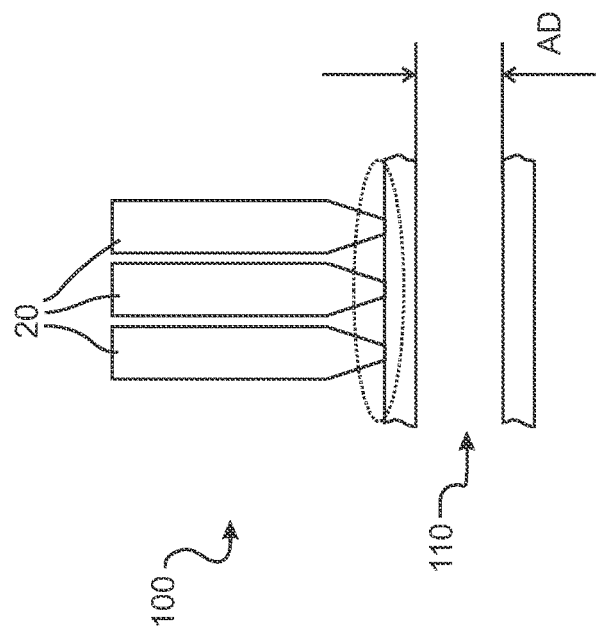
Figure 5:
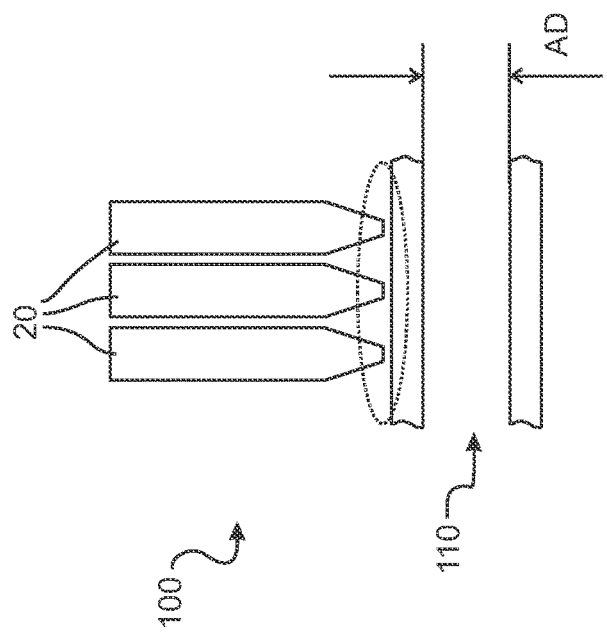

FIGS. 4 and 5 show the possibility of achieving an adjustment free from clearance. Thus, part of the adjusting movement can imply to bring the individual adjusting bolts into contact with the upper nozzle lip above the nozzle discharge slot 110. Starting from FIG. 4, the adjusting bolts 20 are thus applied to the nozzle lip of the nozzle discharge slot 110 from above, as it were, for example with a defined pre-tensioning force, as shown in FIG. 5.

Figure 6:
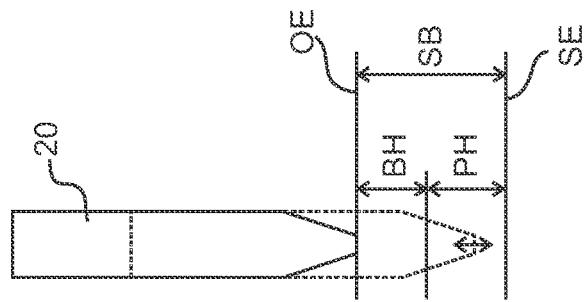
Figure 7:
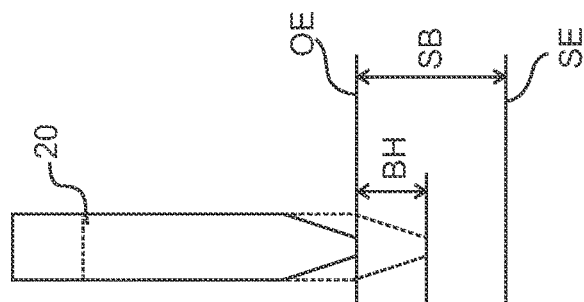
Figure 8:
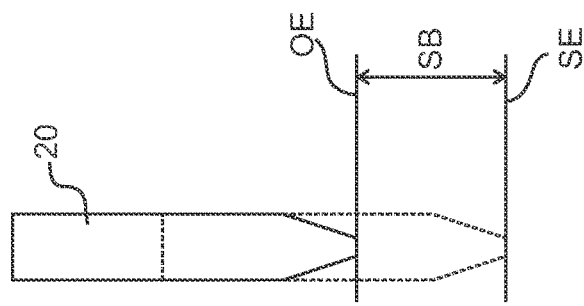

FIGS. 6, 7 and 8 schematically show the possibilities of the basic stroke path BH and the process stroke path PH during the adjusting movement and the controlling movement. FIG. 6 shows the adjusting bolt 20 in its two extreme positions, namely the opening end position OE and the closing end position SE shown in dashed lines. Thus, the entire region of movement is given as the adjusting region SB, which is designed in particular to be smaller than approx. 2 mm, but larger than approx. 1 mm. For the first adjustment of the flat film machine 100, a movement of the adjusting bolt 20 from the opening end position OE along the basic stroke path BH takes place, as shown in FIG. 7. Once this initial adjustment has occurred, actual process controlling can now be performed by opening and closing accordingly within the process stroke path PH of the adjusting bolt 20 as shown in FIG. 8.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS 10 adjusting device
20 adjusting bolt
30 storage device
100 flat film machine
110 nozzle discharge slot
200 film track
AD discharge thickness
SB adjusting region
SE closing end position
OE opening end position
BH basic stroke path
PH process stroke path

The invention claimed is:

1. A method for controlling a nozzle discharge slot of a flat film machine with an adjusting device for controlling a discharge thickness of a nozzle discharge slot of a flat film machine, comprising a plurality of adjusting bolts for carrying out an adjusting movement for changing the discharge thickness, wherein the adjusting bolts comprise an adjusting region between a closing end position and an opening end position, wherein further starting from the opening end position, the adjusting region comprises a basic stroke path for a basic adjustment of the discharge thickness and, starting from the closing end position, comprises a process stroke path for process controlling of the discharge thickness, comprising the following steps:

adjusting a starting control value for the discharge thickness on a plurality of adjusting bolts by movement along the basic stroke path;

controlling the discharge thickness based on a preset value by moving the plurality of adjusting bolts along the process stroke path;

wherein the adjusting device performs both the adjusting and the controlling using the same adjusting bolt from the plurality of adjusting bolts at a respective local position.

2. The method according to claim 1, wherein after the adjusting movement of the discharge thickness along the basic stroke path, the end position of this adjusting movement is stored as the starting position for the subsequent controlling movements of the adjusting bolts.

3. The method according to claim 1, wherein the adjusting movement and the controlling movement are at least partially performed in parallel in time.

4. The method according to claim 1, wherein the adjusting movement takes place without clearance or at most with 0.1 millimeter clearance.

5. The method according to claim 1, wherein at least the adjusting movement or the controlling movement takes place at least in sections locally with a selection of adjacent adjusting bolts.

* * * * *